United States Patent

Feigel et al.

[11] Patent Number: 5,934,766
[45] Date of Patent: Aug. 10, 1999

[54] MAGNETICALLY OPERATED, MULTI-POSITION, PRESSURE CONTROL VALVE HAVING INTEGRAL METERING ORIFICE

[75] Inventors: Hans-Jorg Feigel, Rosbach; Andreas Klein, Bad Homburg; Ulrich Neumann, RoBdorf; Lothar Schiel, Hofheim, all of Germany

[73] Assignee: ITT Manufacturing Enterprises Inc., Wilmington, Del.

[21] Appl. No.: 08/836,799

[22] PCT Filed: Oct. 26, 1995

[86] PCT No.: PCT/EP95/04206

§ 371 Date: Aug. 25, 1997

§ 102(e) Date: Aug. 25, 1997

[87] PCT Pub. No.: WO96/15928

PCT Pub. Date: May 30, 1996

[30] Foreign Application Priority Data

Nov. 18, 1994 [DE] Germany ............................ 44 41 150

[51] Int. Cl.[6] ...................................................... B60T 8/36
[52] U.S. Cl. ...................................... 303/119.2; 137/627.5
[58] Field of Search .............................. 303/119.2, 119.3, 303/113.1, 115.2; 137/625.37, 625.3; 251/129.02, 129.05, 129.07, 129.08

[56] References Cited

U.S. PATENT DOCUMENTS 5,186,093  2/1993  Kervagoret ........................... 303/119.2
5,503,184  4/1996  Reinartz et al. ...................... 303/119.2
5,641,211  6/1997  Feigel et al. ......................... 303/119.2

Primary Examiner—Matthew C. Graham
Attorney, Agent, or Firm—Rader, Fishman & Grauer PLLC

[57] ABSTRACT

The present invention relates to a pressure control valve including a valve tappet which is axially movably arranged in the valve housing and, in a first switch position, provides a pressure fluid connection between a first pressure fluid port that opens into the valve housing and a second pressure fluid port that opens into the valve housing, wherein the valve tappet, in a second switch position, separates the pressure fluid connection between the first pressure fluid port and the second pressure fluid port and, in a third switch position, provides a pressure fluid connection between the second pressure fluid port and a third pressure fluid port, to which end a valve closure member which is axially slidable by the valve tappet is lifted from its valve seat. Another valve closure member is arranged in the valve housing so as to be displaceable in relation to the valve tappet, the valve closure member providing an unimpeded pressure fluid connection between the first pressure fluid port and the second pressure fluid port in a first operating position of the valve tappet and interrupting the pressure fluid connection between the first and the second pressure fluid port in another operating position, and, in the first operating position, having a valve opening cross-section which constantly adjusts the pressure fluid volume flow between the first and the second pressure fluid port.

8 Claims, 1 Drawing Sheet

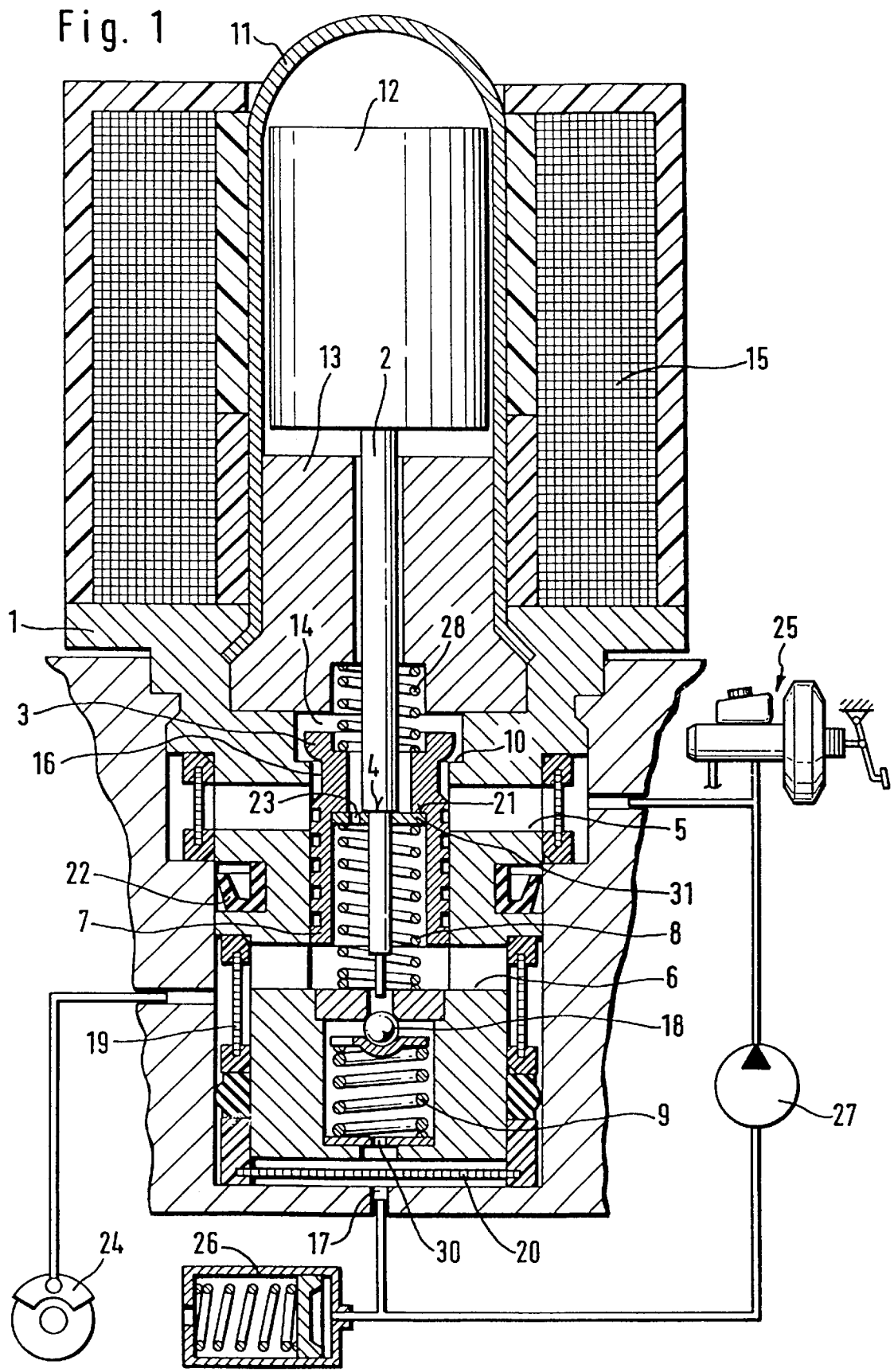

MAGNETICALLY OPERATED, MULTI-POSITION, PRESSURE CONTROL VALVE HAVING INTEGRAL METERING ORIFICE

BACKGROUND OF THE INVENTION

The present invention relates to a pressure control valve, in particular an electrically operable multi-way valve for hydraulic automotive vehicle brake systems with wheel slip control.

German patent No. 29 09 504 discloses a pressure control valve wherein the valve tappet is configured as a slide valve for pressure control in order to provide a pressure fluid connection between a first and a second pressure fluid port in a first switch position and to separate the above-mentioned pressure fluid ports in a second switch position of the valve slide. In the third switch position, the valve tappet will open a spherical non-return valve, thereby opening another pressure fluid connection to the second pressure fluid port.

However, a shortcoming of the pressure control valve is that the valve slide, on the one hand, necessitates a high degree of fitting precision to be able to govern leakage flows at the control edge which are responsive to manufacture and temperature. On the other hand, no provision is made to ensure the pressure reduction in the connected line system in case the valve slide becomes jammed.

European patent No. 0 353 635 discloses a valve assembly having a slide valve which acts as a flow control valve. The flow control valve generally has a piston which controls the volume flow between a pressure fluid source and a pressure fluid consumer as a function of the switch position of an electromagnetically operated actuating member. To perform this function, the piston has a relatively long stem with through-bores which include control edges. The control edges cover the pressure fluid channels of the pressure fluid consumer or the pressure fluid source which open radially into the valve housing. Undesired leakage due to the annular slot in the area of the control edge cannot be prevented in spite of the relatively long piston stem. Further, the serial arrangement of the flow control valve and the electromagnetically operable actuating member causes a substantial structural volume of the valve assembly. Sealing problems which are typical of slide valves will occur.

OBJECT OF THE INVENTION

Therefore, an object of the present invention is to provide a pressure control valve which ensures a functionally reliable pressure control and a compact and miniaturized structure by simple means. In particular, the pressure fluid supply shall be achieved by using a seat valve and a fluid volume which is as independent as possible of the tandem master cylinder pressure, thereby contributing to minimizing valve switching noises. In addition, the valve shall permit a pressure-maintain phase and generally include a quick-reaction operation at low response forces.

SUMMARY OF THE INVENTION

According to the present invention, this object is achieved by the characterizing features of patent claim 1, wherein another valve closure member is arranged in the valve housing so as to be displaceable in relation to the valve tappet. The valve closure member provides an unimpeded pressure fluid connection between the first pressure fluid port and the second pressure fluid port in a first operating position and interrupts the pressure fluid connection between the first and the second pressure fluid port in another operating position. In the first operating position, the valve closure member has a metering orifice at a bore step with a valve opening cross-section which controls the pressure fluid volume flow between the first and the second pressure fluid port.

Further objects, features, advantages and possible applications of the present invention can be seen in the following description of an embodiment.

BRIEF DESCRIPTION OF THE DRAWING

FIG. 1 shows a pressure control valve, in a longitudinal cross-sectional view which is enlarged several times.

DETAILED DESCRIPTION OF THE DRAWING

A valve housing 1 of the pressure control valve, having a cartridge design, is retained in a valve block in a caulked manner. A deepdrawn valve sleeve 11 is retained in the valve housing 1 made of steel by a caulked portion provided in the end area of the valve sleeve 11. To attach the valve housing 1 and the valve sleeve 11, further attachment methods involving positive engagement and/or operative engagement are appropriate which are, however, not dealt with in this embodiment. The dome area of the valve sleeve 11 accommodates the magnetic armature 12 on which valve tappet 2 is mounted. Valve tappet 2 extends through a bore of the magnetic core 13 up to a pressure chamber 14. The base of the valve sleeve 11 staked with the valve housing 1 is supported on the magnetic core 13. Valve sleeve 11 accommodates a valve coil 15 which ensures the electromagnetic actuation of the valve tappet 2. The pressure chamber 14, which is disposed downstream of the magnetic core 13, accommodates an annular piston 7 which is axially movable and metallically sealed within the pressure chamber 14.

The portion of the annular piston 7 close to the magnetic core 13 has an annular groove 16 which includes a pressure fluid passage between a first pressure fluid port 5 and a bore step 10 of the pressure chamber 14 adjacent to the magnetic core 13. The bore step 10 can be closed by a portion on the annular piston 7 which is enlarged and forms the second valve closure member 3. The second valve closure member 3, in the construction of a seat valve member which extends like a ball externally to the annular groove 16, is a component part of the annular piston 7. The end surface of the annular piston 8 remote from the valve closure member 3 extends up to the area of a second pressure fluid port 8 which also opens radially into the pressure chamber 14. In the disclosed embodiment, the second pressure fluid port 8 provides the wheel brake port for a hydraulic brake system with wheel slip control. On the other hand, the first pressure fluid port 5 is connected to the port of a braking pressure generator 25. A third pressure fluid port 17 which is closed by a valve closure member 18 in the direction of the pressure chamber 14, as shown, is connected to a pressure fluid collecting means 26 which stores the pressure fluid originating from the wheel brake port and redelivers it to the first pressure fluid port 5 in case of need. Both valve closure members 3, 18 which act as seat valves are arranged diametrally relative to each other and are operable independently of each other, oppositely in terms of their effect. The valve closure member 18, which is arranged upstream of the third pressure fluid port 17, can be cracked open by electromagnetic actuation of the valve tappet 2 exclusively in opposition to a compression spring 9 which acts upon the valve closure member 18 in the closing direction. The second valve closure member 3 mounted on the annular piston 7 can perform a closing movement, by way of the valve tappet 2 and by biassing of a compression spring 8. The closing movement is initiated by a compression spring 28 arranged above the annular piston 7. The valve tappet 2 extends coaxially in relation to the two oppositely acting compression springs 8, 28 up to the valve closure member 18 which is arranged downstream of the pressure fluid port 6. The valve tappet 2 includes a step 4 within the annular piston 7. On step 4, a disc 31 having a metering orifice 23 is supported and urged against a step 21 in the annular piston 7 under the action of the compression spring 8. The disc 31 can also be designed integrally by the valve tappet 2, and the metering orifice may be configured as a notch, recess, flattened portion or any similarly shaped provision on the valve tappet, on the one hand, and by the step 21, on the other hand. The annular piston 7 functions as a volume flow control valve on which the valve closure member 3, which is open in the initial position, is mounted as an integral component. Undesirable leakage flows between the first and the second pressure fluid port 5, 6 are minimized, preferably by a slot sealing with pressure relief grooves on the periphery of the annular piston 7. The annular grooves (pressure relief grooves) on the periphery of the annular piston 7 prevent a one-sided contact with the bore wall. The valve housing 1 (valve cartridge) is sealed in the valve accommodating block by self-caulking and annular sealing. Ring and plate filters 19, 20 keep the interior of the pressure control valve clean.

The operation of the pressure control valve in connection with a hydraulic automotive vehicle brake system with wheel slip control will be explained hereinbelow.

The drawing shows the pressure control valve in the electromagnetically non-energized switch position which, simultaneously, refers to the brake release position and the normal braking phase when the valve is used for a slip-controlled brake system. In this position, there is an unimpeded pressure fluid connection from the braking pressure generator 25 through the first pressure fluid port 5, the annular filter element 19, the annular groove 16, the open valve closure member 3 and the opening cross-section of the metering orifice 23 in the annular piston 7 in the direction of the second pressure fluid port 6 which ends at the wheel brake 24. Starting from a minimum volume flow Qmin, a constant pressure difference results at the metering orifice 23 and determines the volume flow.

As shown in the drawing, the valve tappet 2 is remote from the valve closure member 18 which, under the action of the compression spring 9, separates the pressure fluid connection between the first and second pressure fluid ports 5, 6 and the pressure fluid port 17 which leads to the pressure fluid collecting means 26.

When inadmissibly high wheel slip values occur which are detected by suitable means of a signal evaluating electronic unit when the vehicle is overbraked, the coil 15 is electromagnetically energized, with the result that the magnetic armature 12 performs a stroke movement. During the stroke movement, the compression spring 8 is compressed by way of the disc-shaped stop on the step 4 of the valve tappet 2 so that compression spring 28, which abuts on the end surface of the annular piston 7 above the compression spring 8, moves the valve closure member 3 towards the bore step 10 for closing. In a binary switching operation of the valve, the valve tappet 2 lifts the valve closure member 18, in opposition to the effect of the compression spring 9, from its valve seat in the valve housing 1. This causes the pressure fluid compressed between the pressure chamber 14 and the wheel brake 24 to flow through the second orifice 30, which is arranged downstream of the valve closure member 18, in the direction of the pressure fluid collecting means 26. The magnetic armature 12 is in abutment on the magnetic core 13, or an anti-adhesive washer is interposed. Calibration of the orifice 30 determines the pressure reduction gradient. When an analog control is used to actuate the valve tappet 2, a pressure-maintain phase can be adjusted in contrast to the binary operation of the valve tappet 2. The pressure-maintain phase is achieved by an intermediate position of the valve tappet stroke where the upper valve closure member 3 has just been closed and the lower valve closure member 18, which is closed in the initial position, is not yet actuated by the valve tappet 2. A volume flow control by way of the annular groove 16 is performed in dependence on the size of the metering orifice 23 in the direction of the wheel brake 24. When the magnetic armature 12 is in its maximum stroke position, the valve closure member 18 which is cracked open by the valve tappet 2, will exclusively perform pressure control so that the orifice 30, following the valve closure member 18 that is closed in the initial position, is not required in the event of analog operation of the magnetic armature 12. Thus, the pressure in the wheel brake 24 can be discharged very quickly in the direction of the pressure fluid collecting means 26. A pump 27 supplies the pressure fluid escaping from the wheel brake 24 to the braking pressure generator 25 or the pressure control valve.

If oversteering of the electrohydraulic pressure modulation, to the effect of a pressure reduction initiated manually by way of the braking pressure generator 25 (brake pedal moves to the release position), is needed during the pressure-maintain phase or pressure increase phase, the pressure in the wheel brake 24 can be reduced at any time in the direction of the first pressure fluid port 5 by way of a non-return cup seal 22 fitted on the valve housing 1.

If pressure shall be re-increased in the wheel brake 24 upon completion of the pressure reduction phase, the electromagnetic energization of the magnetic armature 12 will be interrupted, with the result that the annular piston 7, under the effect of the compression spring 8, moves in the direction of the magnetic core 13 to adopt its initial position again. The pressure fluid which originates from the braking pressure generator 25 and is applied to the annular groove 16 is again conducted through the passage at the valve closure member 3, in dependence on a pressure difference which is adjusted constantly on the metering orifice 23, and with a constant volume flow. The annular piston 7 moves to a breathering position which governs the opening cross-section on the bore step 10. In the breathering position, the resilient force resulting from the two compression springs 8, 28, as a function of the cross-sectional surface of the annular piston 7, is in balance with the pressure difference adjusted on the metering orifice 9. In the present case of application for an anti-lock brake system, the above described flow control function acts above a defined response pressure of a few bar. The advantage of the flow control function is that a constant pressure increase gradient is achieved irrespective of pressure variations between the braking pressure generator 25 and the wheel brake 24. The pressure increase gradient can be maintained irrespective of the respective pilot pressure of the braking pressure generator 25 which is above the response pressure of the flow control valve. This avoids noises which previously occurred due to differently sized pressure pulses during the braking pressure control phase. The present arrangement of the annular piston 7, acting as a flow control valve, permits maintaining a valve closure member 3, which is open in the initial position, and maintaining a valve closure member 18 which is suitable for the pressure reduction phase and is also configured as a seat valve. A particularly compact pressure control valve is thereby achieved which combines the advantages of seat valves which are electromagnetically open and closed in their de-energized state with the advantage that a volume flow control function is ensured which, in particular, causes low noise and is simple and reliable. Further, possible leakages are excluded almost completely. The employment of an analog valve operation is particularly favorable and permits the previously known flow control function in two-way/two-position directional control valves for use in three-way/three-position directional control valves with a pressure-balanced seat valve member. Because the function of the valve closure member 3 is almost independent of the differential pressure between the braking pressure generator 25 and the wheel brake 24, a pressure control valve having a particularly quick switching operation is achieved so that smaller valve coils 15 with a lower energy consumption may be used. Further, the proposed pressure control between the second and the third pressure fluid port 6, 17 permits simplifying the electronics because no additional electric actuators are required for the actuation of the valve closure member 18 which acts as a spherical non-return valve.

We claim:

1. A pressure control valve including a valve tappet which is axially movably arranged in the valve housing and, in a first switch position, provides a pressure fluid connection between a first pressure fluid port that opens into the valve housing and a second pressure fluid port that opens into the valve housing, wherein the valve tappet, in a second switch position, separates the pressure fluid connection between the first pressure fluid port and the second pressure fluid port and, in a third switch position, provides a pressure fluid connection between the second pressure fluid port and a third pressure fluid port to which end a first valve closure member, which is axially slidable by the valve tappet, is lifted from its valve seat, wherein a second valve closure member is arranged in the valve housing so as to be displaceable in relation to the valve tappet, the second valve closure member providing an unimpeded pressure fluid connection between the first pressure fluid port and the second pressure fluid port in a first switch position of the valve tappet and interrupting the pressure fluid connection between the first and the second pressure fluid port in another switch position, and, in the first switch position, the second valve closure member having a metering orifice at a bore step with a valve opening cross-section which adjusts the pressure fluid volume flow between the first and the second pressure fluid port wherein the second valve closure member includes a transition area, tapering as an annular groove, to the annular piston which provides an unimpeded hydraulic connection between the first pressure fluid port and the pressure chamber.

2. The pressure control valve as claimed in claim 1, wherein the second valve closure member is configured as a seat valve aligned coaxially to the valve tappet.

3. The pressure control valve as claimed in claim 1, wherein the second valve closure member is fitted to an annular piston which is sealed and axially movable in a pressure chamber.

4. The pressure control device as claimed in claim 3, wherein the annular piston has a metering orifice which bears against steps of the valve tappet and the annular piston.

5. The pressure control device as claimed in claim 3, wherein the annular piston on either end is acted upon by compression springs which are supported on end surfaces that confine the pressure chamber.

6. The pressure control valve as claimed in claim 5, wherein the valve tappet extends coaxially to the compression springs and through the annular piston until ahead of one of the valve closure members.

7. The pressure control device as claimed in claim 5, wherein, in the electromagnetically non-energized position of the magnetic armature, the compression spring moves the annular piston along with the valve tappet into a switch position where a pressure fluid connection between the pressure fluid port and the second pressure fluid port is provided.

8. A pressure control valve including a valve tappet which is axially movably arranged in the valve housing and, in a first switch position, provides a pressure fluid connection between a first pressure fluid port that opens into the valve housing and a second pressure fluid port that opens into the valve housing, wherein the valve tappet, in a second switch position, separates the pressure fluid connection between the first pressure fluid port and the second pressure fluid port and, in a third switch position, provides a pressure fluid connection between the second pressure fluid port and a third pressure fluid port to which end a first valve closure member, which is axially slidable by the valve tappet, is lifted from its valve seat, wherein a second valve closure member is arranged in the valve housing so as to be displaceable in relation to the valve tappet, the second valve closure member providing an unimpeded pressure fluid connection between the first pressure fluid port and the second pressure fluid port in a first switch position of the valve tappet and interrupting the pressure fluid connection between the first and the second pressure fluid port in another switch position, and, in the first switch position, the second valve closure member having a metering orifice at a bore step with a valve opening cross-section which adjusts the pressure fluid volume flow between the first and the second pressure fluid port wherein the annular piston on either end is acted upon by compression springs which are supported on end surfaces that confine the pressure chamber wherein, in the electromagnetically non-energized position of the magnetic armature, the compression spring moves the annular piston along with the valve tappet into a switch position where a pressure fluid connection between the pressure fluid port and the second pressure fluid port is provided.

\* \* \* \* \*